Jan. 26, 1965  A. J. WATSON  3,166,998
PHOTOGRAPHIC DODGING METHOD AND APPARATUS
Filed Nov. 19, 1959  2 Sheets-Sheet 1

INVENTOR
Alfred J. Watson

BY Mason, Fenwick & Lawrence
ATTORNEYS

Jan. 26, 1965 A. J. WATSON 3,166,998
PHOTOGRAPHIC DODGING METHOD AND APPARATUS
Filed Nov. 19, 1959 2 Sheets-Sheet 2
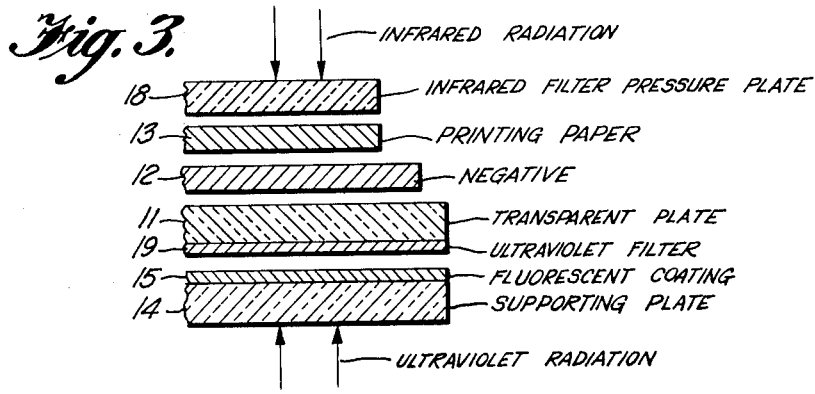
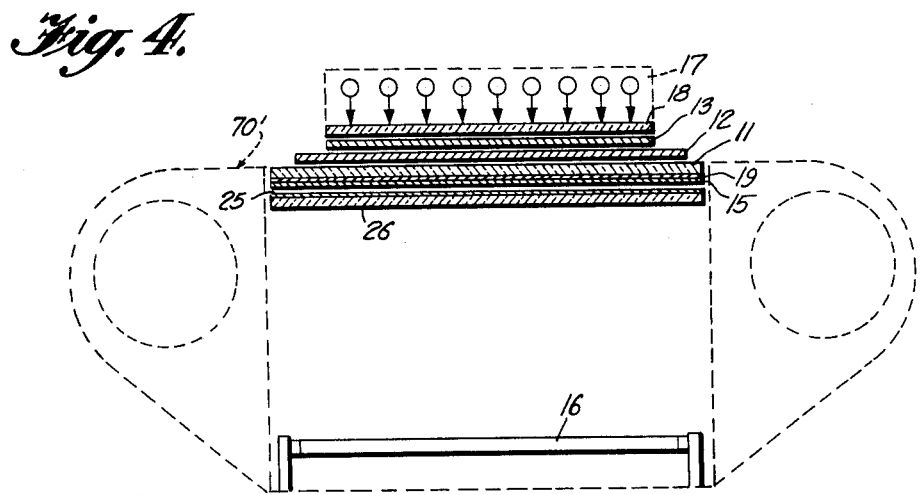
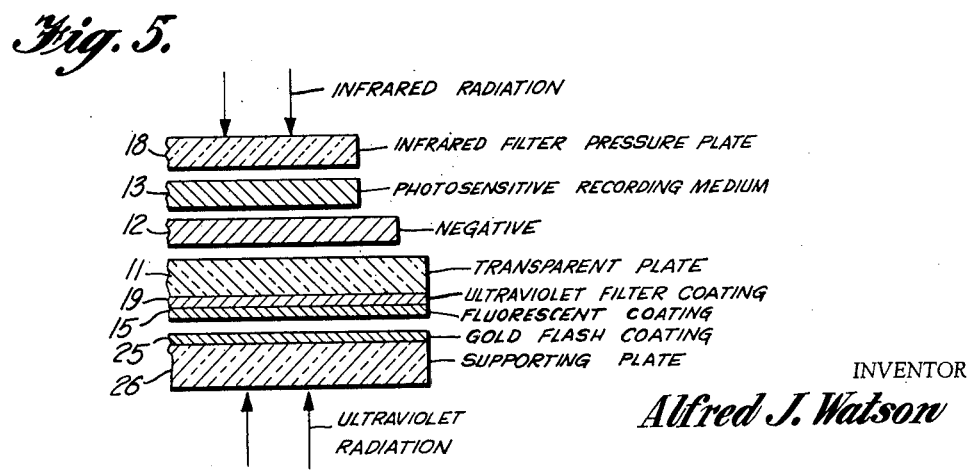
INVENTOR
Alfred J. Watson
BY
Mason, Fenwick & Lawrence
ATTORNEYS United States Patent Office 3,166,998
Patented Jan. 26, 1965

3,166,998
PHOTOGRAPHIC DODGING METHOD
AND APPARATUS
Alfred J. Watson, Arlington, Va., assignor to Watson Electronics & Engineering Co., Inc., Arlington, Va., a corporation of Virginia
Filed Nov. 19, 1959, Ser. No. 854,200
15 Claims. (Cl. 95—73)

The present invention relates in general to photographic printing methods and apparatus, and more particularly to methods and apparatus for automatically dodging photographic negatives during production of positive or negative prints or photographic reproductions to vary the exposure source intensity in selected relation to density variations in the negative in a manner to effectively compress the density differences in the negative or selected regions thereof.

This application is a continuation-in-part of my prior applications Serial No. 664,010 filed June 6, 1957, now abandoned, and Serial No. 765,852 filed October 7, 1958, now abandoned.

The present invention has particular application to the field of aerial photography and to the production of aerial photographic prints or reproductions such as diapositives for compilation and analysis. The exposure of the photographic negatives in connection with aerial photography are, of course, made under controlled lighting conditions. The aerial photographic negatives, therefore, have very complex patterns of wide density variations corresponding to variations in the brightness of the scenes to which the negative emulsion is exposed. The development of photographic film emulsions has advanced to the stage where the film is capable of recording the detail in the camera field over the ranges of brightness encountered in aerial photographic exposure conditions. However, the principal photographic printing or reproducing materials which are designed to produce high contrast prints, diapositives, transparencies, and the like have short exposure ranges and are not capable of recording the detail in the deep shadow areas and the extreme highlight areas of the negative. Consequently, while the original negative has faithfully recorded detail throughout the brightness range of the exposure conditions, much of this detail is lost in the final reproduction.

Much effort has been directed to the preservation of the original negative detail in the final reproduction through the practice of dodging during exposure of the reproductions. Dodging of aerial photographs has been accomplished in the past by both manual and electronic means. Many of the printers presently in use make provision for manual dodging during exposure by using, as the exposure light source, a large number of low power mercury vapor-type lamps which can be individually extinguished by manually throwing switches associated with the lamps. The operator can, therefore, view the negatives and adjust the light intensities of the individual lamps comprising the light source in accordance with variations in the density of the negative to compensate, within limits, for the varying undesirable densities in the negative. Such manual manipulation to satisfactorily dodge the negatives, however, requires long experience and good judgment, and can be effectively practiced by only a few very highly skilled operators. Also, because of the very careful inspection of the minute increments making up the total areas of each negative which is required to effect proper adjustment of the bank of lamps forming the exposure source, this practice is both time-consuming and laborious.

Another practice that has been resorted to is to make use of masks which have been photographically reproduced from the negative itself, which are exposed and developed in such a manner as to modulate the exposure light source to provide relatively greater exposure intensity in the dense regions of the negative density regions. The difficulty with this procedure is that it greatly increases the time consumed in producing a corrected photographic reproduction as it necessitates two exposure and developing procedures to produce one corrected reproduction, the first to produce the mask and the second to produce the corrected reproduction.

The electronic means resorted to for effecting automatic dodging of aerial photographs are highly complex and have therefore produced maintenance problems of an extensive nature. They have also been found to be limited in their range of density compensation and are limited in speed of operation since photoelectric means must be resorted to to detect the quantum of light transmitted through each region of the negative and effect correction of the exposure light intensity allocated to each negative region before the printing material becomes substantially exposed through that region.

An object of the present invention, therefore, is the provision of a novel photographic exposure means and method for automatically dodging photographs during the production of reproductions from negatives.

Another object of the present invention is the provision of novel means for automatically varying the exposure light source intensity in photographic reproduction operations in selected relation to negative density in minute negative areas so as to have the effect of compressing the density differences in the negative to produce a dodged reproduction.

Another object of the present invention is the provision of novel means for automatically dodging aerial photographs and the like during exposure of reproductions from the negative, wherein the areas of the exposure light source corresponding to the minute areas making up the negative are simultaneously and automatically varied in selected relation to the densities of the minute negative areas to produce a dodged photographic reproduction of the negative.

Another object of the present invention is the production of novel automatic dodging means for photographic printers for aerial photographs or the like which minimizes maintenance problems and speed of operation and has greater dodging latitude.

Another object of the present invention is the provision of novel means for dodging reproductions of photographic exposure records wherein means are provided to selectively enhance the dodging effects in selected areas of the exposure record.

Another object of the present invention is the provision of novel means for dodging reproductions of photographic exposure records involving infrared quenching of ultraviolet activated fluorescent coatings wherein means are provided for enhanced quenching of the fluorescent coating and for varying the extent of dodging over large and small detail of the image area.

Other objects, advantages and capabilities of the present invention will become apparent from the following detail description, taken in conjunction with the figures of the drawing wherein two preferred embodiments of the invention are illustrated.

In the drawings:

FIGURE 3 is a fragmentary diagrammatic illustration to enlarged scale of the arrangement of components in the region of the photographic negative in the embodiment of FIGURE 1;

FIGURE 4 is a diagrammatic illustration of a second preferred embodiment of photographic printing apparatus embodying the present invention; and FIGURE 5 is a fragmentary diagrammatic illustration to enlarged scale of the arrangement of components in the region of the photographic negatives in the embodiment of FIGURE 4.

The exposure control of photographs in accordance with the present invention relies upon the known phenomenon in connection with fluorescence that the activation of fluorescent and phosphorescent materials can be counteracted by frequencies which oppose, in a sense, the frequency of the activating source. This counteraction of the luminescence of the fluorescent or phosphorescent material is known as quenching. The present invention applies this phenomenon to the control of exposure in photographic printing by employing a fluorescent or phosphorescent body or coating as the exposure source by which the photosensitive emulsion of the photographic recording medium is exposed through the photographic negative. The output luminescence of the activated fluorescent or phosphorescent material is quenched by quenching radiations transmitted through the photographic negative so that the fluorescent or phosphorescent portions corresponding to and in registry with the minute portions making up the negative are quenched in accordance with the negative densities of those portions. In this way, the output luminescence of the fluorescent or phosphorescent material corresponding in location to the thin density portions of the negative is more heavily quenched and therefore less than the output luminescence of those portions corresponding to the heavy density regions of the negative, and the entire area of the exposure source-forming fluorescent body is varied in output luminescence simultaneously in relation to the densities of the corresponding negative portions to effect the desired exposure of the recording emulsion.

Figure 1:
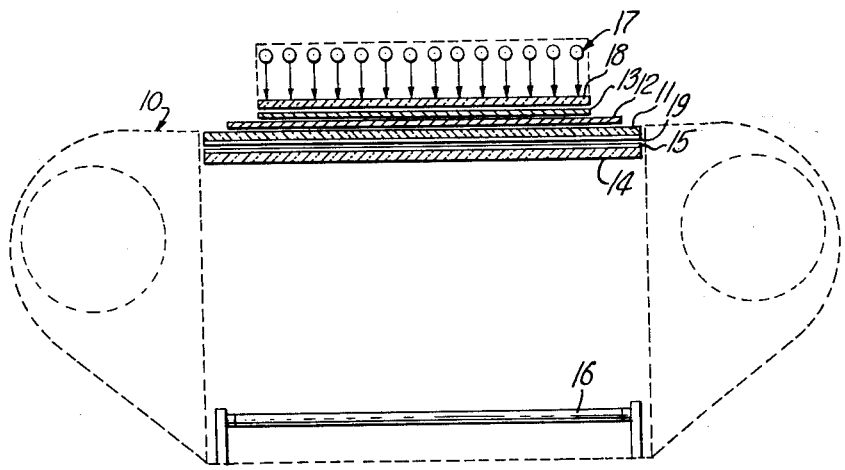
FIGURE 1 is a diagrammatic illustration of a first preferred embodiment of photographic printing apparatus embodying the present invention.
Figure 2:
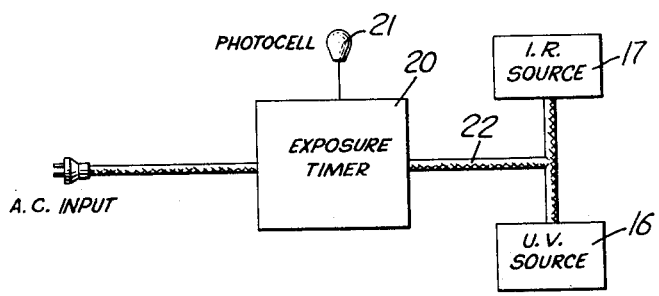
FIGURE 2 is a block diagram illustrating schematically the electrical components of the present invention.

Referring to FIGURES 1 to 3 of the drawing illustrating the first preferred embodiment, there is shown a photographic printer, indicated generally by the reference character 10, for producing photographic records of photographic negatives such as developed aerial photographic film and the like. The printer 10 is provided with the usual transparent stage plate 11 upon which the photographic negative 12 is to be positioned. In accordance with usual practice, the exposure light emanates from within the printer 10, and the photographic recording medium 13 is positioned over the negative 12 with the emulsion facing downwardly toward the exposure light source to expose the emulsion through the negative 12. Located within the printer 10 and below the stage plate 11 is an exposure light source for the photographic recording medium 13. This exposure source in accordance with the present invention relies upon an activated fluorescent or phosphorescent material to produce the actinic output luminescence by which the photosensitive emulsion is exposed, and may, for example, take the physical form of a fluorescent screen or a transparent rectangular plate 14 having a fluorescent coating 15 deposited thereon and extending over an area at least as great as the area of the negative 12 and photographic recording medium 13. The fluorescent coating or screen 15 in one preferred embodiment of the invention is formed of activated zinc sulphide thermographic type phosphor, and should be a fluorescent material which has strong actinic characteristics in the 4200 to 4400 angstrom unit wave length range to which the photosensitive emulsions are highly responsive. Examples of photosensitive emulsions which may be used satisfactorily in the practice of the present invention for the photographic recording medium 13 are Koda Bromide-Ordinary manufactured by Eastman Kodak Company or Varigam paper manufactured by Du Pont. One of the prime advantages of this invention is that it permits choice of the print paper. High contrast paper is usually desirable.

The fluorescent coating or screen 15 is activated from below to provide an output light intensity sufficient to expose the emulsion of the photographic recording medium 13 by an ultraviolet radiation source 16 which may take the form of a bank of parallel elongated ultraviolet lamps lying in a plane arranged parallel to the plane of the fluorescent coating or screen 15 and the stage plate 11. Upon activation of the fluorescent coating 15 by the ultraviolet radiation source 16, the fluorescent coating 15 would exhibit uniform brightness and cause an exposure which would exactly conform to the negative densities. However, quenching of the output luminescence of the fluorescent coating 15 is achieved by arranging an infrared radiation source, indicated generally by the reference character 17, above the photographic recording medium 13 and negative 12 to radiate infrared radiation through the recording medium 13, negative 12, and stage plate 11 to the fluorescent coating 15. The infrared radiation source 17 may also take the form of a bank of infrared lamps spaced above and lying in a plane paralleling the photographic recording medium 13. An infrared transmitting filter pressure plate 18 is spaced above the stage plate 11 to bear upon the upper surface of the photographic recording medium, which usually takes the form of a sensitized paper or plate, to press the recording medium 13 and negative 12 firmly against the stage plate 11. An ultraviolet filter, indicated at 19, is also located between the stage plate 11 and the fluorescent coating or screen 15, and may take the form of an ultraviolet filter medium arranged on the undersurface of the stage plate 11. It may also be positioned on the upper surface or within plate 11. This ultraviolet filter 19 may take the form of a K2 filter manufactured by Eastman Kodak Company. The purpose of the ultraviolet filter 19 is to block transmission of the ultraviolet radiation emanated by the ultraviolet source 16 directly to the photographic emulsion of the recording medium 13 so that the photographic recording medium is exposed only to the output luminescence of the fluorescent coating or screen 15.

Preferably there is associated with the printer an exposure timer of conventional design, indicated generally by the reference character 20, having a photocell 21 associated therewith exposed to the output luminescence of the fluorescent coating or screen 15 and responsive thereto for conditioning the exposure timer 20 to terminate exposure automatically when a preselected quantum of light has been emitted. These exposure timers are well-known in the art and do not require further description here. However, instead of coupling the output of the conventional exposure timer to the single exposure lamp of the usual photographic printer, the output 22 of the exposure timer 20 is coupled to the infrared radiation source 17 and the ultraviolet source 16 to de-energize these sources in the same way the usual exposure timer de-energizes the exposure lamp.

In the operation of the first preferred embodiment of the present invention, the activating ultraviolet radiation emitted by the ultraviolet source 16 excites the phosphor making up the fluorescent coating or screen 15 to provide output luminescence which will effect exposure of the sensitized paper or plate 13 through the negative 12. However, the fluorescent coating 15 is not excited to uniform brightness throughout its area as the individual small elements making up its total area are quenched by the infrared radiation emitted from the infrared radiation source 17. Since the infrared radiation passes through the photographic negative 12 in reaching the fluorescent coating 15, its intensity is attenuated throughout each portion of the negative 12 in accordance with the negative densities occurring at these portions. Thus, the intensity of the infrared radiation reaching the fluorescent coating 15 varies in accordance with the density of the region of the negative 12 through which the radiation passed, the quenching radiation being less intense for the denser portions of the negative and more intense for the thin or less dense portions of the negative. Consequently, the effective degree of luminescence quenching of output light intensity variation corresponds to the negative densities through which the radiation passes and the exposure light intensity for each portion of the fluorescent coating 15 aligned with a portion of the photographic negative 12 is reduced to a degree corresponding to the thinness of its corresponding negative region. This effects an increase in the quantum of exposure light for the dense regions of the negative to bring out detail in the highlight regions, and a reduction in intensity of the exposure light quantum corresponding to the thin regions of the negative to bring out detail in the shadow regions. It will, of course, be understood that the range of frequencies to which most photographic emulsions, and particularly the examples mentioned herein, are sensitive, lie near the blue end of the spectrum and that such emulsions are insensitive for all practical purposes to infrared radiation.

The actual spacing between the phosphor coating 15 and the negative 12 is an important factor of the invention because, if correct, it varies contrast in a manner to enhance distinguishing of detail in the print. By varying the spacing or separation between the negative 12 and the fluorescent coating 15, control of the dodging or density difference compression can be achieved to retain significant gross dodging and thereby reduce the magnitude of the gross density variation in the print while reducing the dodging effect on small detail and achieving contrast and presentation of small detail which will preserve or enhance observation of image detail. I have discovered that by providing this small separation, the infrared quenching image becomes diffused and the brightness of the phosphor coating thereby affected becomes correspondingly spread at contrast edges, viz., at zones of effective contrast difference which correspond to adjacent zones of different densities in the negative. If this spreading effect is restricted to a certain small range, much image detail will be enhanced in the print. For purposes of the invention this spacing should be from just more than zero to approximately ½ inch. A separation of 1/16 inch has been found to be a very satisfactory optimum. Beyond ½ inch the detail contrast enhancement effect falls off rapidly. However, zero separation may be desirable in direct positive reproduction printing. This can be effected by suitable rearrangement of the component layers.

For example, if the fluorescent coating 15 is spaced 1/16 inch from the negative 12, the quenching infrared radiation modulated by the negative 12 is somewhat diffused, so that the modulated output luminescence of the coating 15 representing small detail in the image is not sharp and accordingly does not provide a sharp quenched or unquenched pattern at the coating 15 in precise registry with corresponding small detail in the negative 12. The spacing of these components from each other produces, in effect, an "unsharp mask" to vary the dodging effect for different parts of the image. The effect of this is to preserve the gross dodging (or compression of gross density variations) while causing the recording medium 13 to record the small detail more nearly in accordance with its contrast properties and by the diffusion to spread slightly the contrast edges and thereby enhance the zone of effective contrast difference. As the fluorescent coating 15 is moved farther away from the negative 12, the resulting greater diffusion of the quenching image progressively increases the size of detail which is not dodged, while preserving the gross dodging.

To illustrate the principle of the invention more clearly, the assembly of components illustrated in FIGURE 1 was drawn out of scale, and with separations between all of the component layers. In an actual printer according to the invention the various layers would be adjacent, except for the above-mentioned separation which can readily be provided by spacing the negative and sensitized-paper unit from the phosphor coating by means of a glass plate, such as stage plate 11, of necessary thickness.

In certain specific applications, it may be essential to provide for parallel radiation of light from the fluorescent coating 15 and the infrared source 17 toward the photographic negative and recording medium. In such cases, conventional means for providing parallel radiation may be incorporated in the system, such as a Fresnel lens system, parabolic reflectors, gratings, and like facilities known in the optical art for producing this effect.

It is also possible with the system of the present invention to provide a direct negative copy of photographic negatives. This would be accomplished by positioning the sensitized paper or plate forming the recording medium 13 below the negative 12 and exposing the emulsion directly to the quenched output luminescence pattern of the fluorescent coating or screen 15. Since the infrared radiation transmitted through the negative 12 and the recording medium 13 forms a quenching pattern over the area of the fluorescent coating 15 in inverse intensity relation to negative density of each portion of the negative, the luminescence intensity pattern of the fluorescent coating constitutes a negative image of the photographic negative so that the emulsion will record a negative copy of the negative rather than a positive copy.

There is illustrated in FIGURES 4 and 5 of the drawings a second preferred embodiment of the invention, shown in connection with a contact photographic printer, the components of this embodiment which correspond to components of the previously described embodiment being indicated by identical reference characters. In this embodiment, the photographic printer 10' is provided with the usual transparent plate 11 upon which the negative 12 is positioned and over which the photographic recording medium such as printing paper or the like, indicated by the reference character 13, is disposed and held in a flat condition by the usual infrared transmitting filter pressure plate 18. An ultraviolet filter 19 is supported on the lower side of the transparent plate 11 as in the preceding embodiment. The fluorescent coating 15 is also supported from the transparent plate 11 in underlying relation to the ultraviolet filter 19 instead of being supported on a separate supporting plate. In a manner similar to that described in the first embodiment, the fluorescent coating 15 is activated from below by an ultraviolet radiation source 16 to provide an output light intensity sufficient to expose the emulsion of the photographic recording medium 13. The output luminescence of the fluorescent coating 15 is quenched by infrared radiation emanating from an infrared radiation source 17 disposed above the pressure plate 18, the infrared radiation being modulated by the density variations in the recorded image in the negative 12 and applied to the fluorescent coating 15 to quench the fluorescent coating. It will be appreciated that the transparent plate 11 may be of a desired minimum thickness to provide the desired degree of detail dodging as described in connection with the preceding embodiment, greater spacing between the fluorescent coating 15 and the negative 12 being obtainable by inserting transparent shim plates of appropriate thickness between the negative 12 and supporting plate 11.

It has been found that the compression of contrast can be markedly increased without increasing the intensity of the infrared source by providing an infrared reflective coating below the fluorescent coating 15. Apparently about 50% of the modulated infrared radiation transmitted to the fluorescent coating 15 through the negative 12 does not produce effective quenching of the output luminescence of the fluorescent coating. By backing up the fluorescent coating 15 with an infrared reflective coating, the modulated infrared radiation reflected back through the fluorescent coating 15 toward the infrared source produces additional quenching. In one preferred physical embodiment, this reflection of modulated infrared radiation back through the fluorescent coating 15 is accomplished by providing a gold flash coating, indicated by the reference character 25, on the upper surface of a suitable supporting plate 26. For example, a gold flash coating of appropriate thickness to transmit approximately 40% visibility light at 500 millimicrons wave length has been found to be satisfactory, as such a gold flash coating transmits a substantial amount of ultraviolet while reflecting substantially all infrared radiation. It will be appreciated that coatings of copper or other known materials which will transmit large amounts of ultraviolet while reflecting large amounts of infrared may be used in place of the gold flash coating.

If the gold flash coating 25 is placed in substantially direct contact with the under surface of the fluorescent coating 15, it has been found that the compression of contrast produced by quenching of the output luminescence of the fluorescent coating 15 is about twice that obtained without the gold flash coating. For example, an IRB 4 phosphor produced by U.S. Radium Corporation, when used in an assembly such as that herein described without the gold flash coating produced a gamma of .7, whereas the IRB 4 phosphor with a gold flash coating in contact with and immediately below the phosphor produced a gamma of .3.

Where such a gold flash coating or infrared reflective coating is used, it has been found that control of detail dodging or detail contrast enhancement may be achieved by adjustment of the spacing or separation of gold flash coating 25 from the fluorescent coating 15. When the gold flash coating 25 is in substantially direct contact with the fluorescent coating 15, there is no appreciable image diffusion of the modulated infrared radiation transmitted through the fluorescent coating 15 to the gold flash coating 25 so that detail dodging (or reduction of detail contrast) is at a maximum. If greater contrast in the detail is desired, the gold flash coating 25 may be moved away from the fluorescent coating 15 in which event the infrared quenching image passing through the fluorescent coating 15 becomes diffused or "unsharp" before reflection back to the fluorescent coating 15. This results in reduction of the detail enhancing quenching effect which would otherwise arise from proximal reflection of the modulated infrared image and recording of this detail information more nearly in accordance with the contrast properties of the recording medium 13.

While only two preferred embodiments of the invention have been particularly shown and described, it is apparent that other modifications may be made in the invention without departing from the spirit and scope thereof, and it is desired, therefore, that only such limitations shall be placed thereon as are imposed by the prior art and set forth in the appended claims.

I claim:

1. A photographic printing method comprising exciting a fluorescent surface to produce actinic light, directing infrared light uniformly through a transparency upon said surface to quench said surface selectively to form a luminous image, and simultaneously directing unquenched actinic light from said fluorescent surface through said transparency and forming an image of said surface on a photosensitive emulsion surface to expose the same.

2. A photographic printing method as set forth in claim 1 wherein said transparency is a photographic negative.

3. A photographic printing method as set forth in claim 1 wherein said infrared light is transmitted through said photosensitive emulsion surface.

4. A photographic printing method wherein dodging of photographic images is effected, comprising exciting a fluorescent surface with radiant energy of a first frequency range to produce actinic light, directing radiant energy of a second frequency range uniformly through a photographic negative having an image recorded therein to said fluorescent surface to quench said fluorescent surface selectively and form a luminous quenched image thereon corresponding substantially to said negative image but wherein small detail in the luminous image is unsharp, and simultaneously directing unquenched actinic light from said fluorescent surface through said negative and forming an image of said fluorescent surface on a photosensitive emulsion surface to expose the same.

5. A photographic printing method wherein dodging of photographic images is effected, comprising exciting a fluorescent surface with ultraviolet radiation to produce actinic light, directing infrared radiation uniformly through a photographic negative having an image recorded therein to said fluorescent surface to quench said fluorescent surface selectively and form a luminous quenched image thereon corresponding substantially to said negative image but wherein small detail in the luminous image is unsharp, and simultaneously directing unquenched actinic light from said fluorescent surface through said negative and forming an image of said fluorescent surface on a photosensitive emulsion surface to expose the same.

6. A photographic printing method as set forth in claim 1, including the step of shielding said photosensitive emulsion surface from exposure to said radiant energy of said first frequency range.

7. A photographic printing method as set forth in claim 5, including the step of shielding said photosensitive emulsion surface from exposure to said ultraviolet radiation.

8. A photographic printing method as set forth in claim 5, including the step of reflecting infrared radiation modulated by said negative and passing through said fluorescent surface back to said fluorescent surface by an infrared reflective member to enhance quenching of said fluorescent surface by said infrared radiation directed through said negative.

9. Photographic printing apparatus for dodging photographic images during printing thereof comprising means for supporting a photographic negative having an image recorded therein in a selected exposure plane, means for supporting a photosensitive emulsion in contacting overlying relation to said negative, a fluorescent screen supported in a plane paralleling and spaced below said exposure plane having an infrared quenchable fluorescent surface responsive to ultraviolet radiations to activate the same to actinic luminescence, an ultraviolet radiation source disposed below said fluorescent screen for exciting said fluorescent surface to produce actinic light, and an infrared radiation source supported above said exposure plane and said photosensiitve emulsion for directing infrared radiation uniformly through said negative and photosensitive emulsion to said fluorescent surface to form a luminous quenched image on said fluorescent surface, said fluorescent surface being located relative to said exposure plane to cause said luminous quenched image to correspond substantially to the negative image with small detail in the luminous image being unsharp, and means for exposing said photosensitive emulsion through said negative to the luminous quenched image of said fluorescent surface simultaneously with directing of infrared radiation through said negative to said fluorescent surface to form a dodged photographic record in said photosensitive emulsion of the image in said negative.

10. Photographic printing apparatus for dodging photographic images during printing thereof comprising means for supporting a photographic negative having an image recorded therein in a selected exposure plane, means for supporting a photosensitive emulsion in contacting overlying relation to said negative, a fluorescent screen supported in a plane paralleling and spaced below said exposure plane having an infrared quenchable fluorescent surface responsive to ultraviolet radiations to activate the same to actinic luminescence, an ultraviolet radiation source disposed below said fluorescent screen for exciting said fluorescent surface to produce actinic light, and an infrared radiation source supported above said exposure plane and said photosensitive emulsion for directing infrared radiation uniformly through said negative and photo-sensitive emulsion to said fluorescent surface to form a luminous quenched image on said fluorescent surface, said fluorescent surface being located relative to said exposure plane to cause said luminous quenched image to correspond substantially to the negative image with small detail in the luminous image being unsharp, a means for shielding said photosensitive emulsion from direct ultraviolet radiation emanating from said ultraviolet radiation source, and means for exposing said photosensitive emulsion through said negative to the luminous quenched image of said fluorescent surface simultaneously with directing of infrared radiation through said negative to said fluorescent surface to form a dodged photographic record in said photosensitive emulsion of the image in said negative.

11. Photographic printing apparatus as defined in claim 10, wherein said fluorescent surface and said negative are substantially parallel and are separated by a distance between zero and approximately one-half inch.

12. Photographic printing apparatus as defined in claim 10, wherein said fluorescent surface and said negative are substantially parallel and are separated by a distance of substantially one-sixteenth inch.

13. Photographic printing apparatus as defined in claim 10, including an infrared reflective layer of material disposed adjacent said fluorescent surface at the side of said fluorescent screen remote from said infrared source to reflect negative-modulated infrared radiation passing from said infrared source and negative through said fluorescent surface back through the same toward said negative.

14. Photographic printing apparatus as defined in claim 13, wherein said infrared reflective layer is a coating of material deposited on a support adjacent the surface of said fluorescent screen remote from said infrared source which is highly reflective to infrared radiation and capable of transmitting a substantial amount of ultraviolet radiation.

15. Photographic printing apparatus as defined in claim 13 wherein said infrared reflective layer is a gold flash coating.

References Cited by the Examiner
UNITED STATES PATENTS

| | | | |
|---|---|---|---|
| 1,565,256 | 12/25 | Christensen. | |
| 1,966,322 | 7/34 | Tuttle. | |
| 2,331,492 | 10/43 | Michaelis | 96—17 |
| 2,332,038 | 10/43 | Wynd et al. | 96—82 |
| 2,482,815 | 9/49 | Urbach | 96—27 |
| 2,511,464 | 6/50 | Clark | 96—82 |
| 2,642,538 | 6/53 | Urbach | 96—44 |
| 2,783,678 | 3/57 | Andreas et al. | 96—27 |
| 2,912,325 | 11/59 | Maurer | 96—45 |

FOREIGN PATENTS

| | | |
|---|---|---|
| 879,325 | 6/53 | Germany. |
| 205,152 | 10/23 | Great Britain. |
| 509,308 | 7/39 | Great Britain. |
| 461,938 | 2/51 | Italy. |

EVON C. BLUNK, *Primary Examiner.*

H. N. BURSTEIN, PHILIP E. MANGAN, D. B. LOWE, NORTON ANSHER, *Examiners.*